US005240043A

United States Patent [19]

Campbell

[11] Patent Number: 5,240,043

[45] Date of Patent: Aug. 31, 1993

[54] WATER SYSTEM

[76] Inventor: Gary J. Campbell, 6480 - 10th Ave., Blanchard, Mich. 49310

[21] Appl. No.: 788,542

[22] Filed: Nov. 6, 1991

[51] Int. Cl.[5] .......................... A01G 25/09; B65B 1/04

[52] U.S. Cl. .................................... 137/899; 137/211; 137/382; 137/614.05; 141/1; 141/98; 141/326; 141/349

[58] Field of Search ..................... 141/1, 349, 98, 326; 137/571, 899, 614.03, 614.05, 149.5, 381, 382, 211

[56] References Cited

U.S. PATENT DOCUMENTS 2,947,330 8/1960 Savage .................................... 141/1
3,225,696 12/1965 Brigman .............................. 137/211
3,472,482 10/1969 Gardner ........................... 251/149.5
3,674,061 7/1972 Calisher et al. ..................... 141/349
4,192,347 3/1980 Richard .......................... 137/614.06
4,420,022 12/1983 Landry ................................ 137/382
4,553,573 11/1985 McGarrah ............................ 141/98
4,606,476 8/1986 Pocock et al. .......................... 141/1
4,641,693 2/1987 Rakucewicz ........................ 141/326
4,683,921 8/1987 Neeser ..................................... 141/1
4,862,931 9/1989 Vella ......................................... 141/1

*Primary Examiner*—A. Michael Chambers
*Attorney, Agent, or Firm*—Price, Heneveld, Cooper, DeWitt & Litton

[57] ABSTRACT

A system for the delivery and storage of bulk quantities of high quality water. The system includes a tank truck having air filters to preclude the entry of noxious materials into the bulk water hauling tanks. A delivery valve and a receiving valve are provided for the substantially air-free transfer of water from the bulk water hauling tank to a storage tank from which water can be supplied to the user. Water storage systems are provided including check valves to protect the quality of the water and the amount of residual water remaining in the storage tank. A pressurized water storage system is provided using a harmless gas and a floating check valve to contain the gas as water is drained from the storage system.

13 Claims, 4 Drawing Sheets

WATER SYSTEM

BACKGROUND OF THE INVENTION

In many parts of the country today, good water is not available. The ground water supplying individual and community wells has been contaminated by naturally occurring contaminants or by residue left by the chemical and petroleum industries. Many large cities in the country have healthy but poor tasting water due to sulphur, iron and other natural deposits. Many people in these areas rely on bottled water for drinking and food preparation since bottled water is the most readily available form of bulk high quality water. In order to have access to high quality water, the people are willing to put up with the expense and inconvenience of bottled water.

At the present time, there appears to be no convenient means available for the bulk delivery of high quality water to homes and buildings. As mentioned above, the most common supply of bulk water is bottled water, with each bottle having to be placed in an inverted position in a support from which the water can be drawn. As we are all familiar, as water is drawn from a bottled water supply, air bubbles into the bottle to displace the water. If the bottled water supply is in a factory or industrial area where the air is contaminated by dust or chemical pollutants, those materials can be drawn into the water bottle along with the air and can dissolve in the water. Other large containers used to carry water are subject to contamination and vandalism if the tops of the containers can be opened. A real need exists for a bulk water supply which can be provided in a home or building which does not require the handling of heavy individual containers and which can be treated in all respects as a conventional water system.

SUMMARY OF THE INVENTION

In accordance with the present invention, a system is provided for the delivery of bulk quantities of high quality water to residential and commercial users. The high quality water is drawn from a source, such as a well or spring safely removed from sources of contamination, and is placed into a sterile tank. The water is hauled to the user's site where it is connected to an installed water storage system. The water is then transferred substantially air-free from the bulk hauling vehicle into the user storage facility. The bulk hauling vehicle is equipped with air filters so that the air entering a water tank to replace the drained water is cleaned so as not to contaminate the water or the water hauling and storage tanks. At the user facility the water can be contained in suitable tanks proportioned to the need of the user. For example, for a large building a large storage tank can be used which would in turn feed one or more smaller tanks which can be used to pressurize the water system for the user.

In areas where the water is healthy but has a poor taste, the water system of the present invention can be connected in parallel with the existing system so that the existing water supply can be used for sanitary and cleaning purposes while the high quality delivered water is used for drinking and food preparation.

A high quality water system is provided including a source of high quality water. Bulk quantities of the water can be hauled from the source to the user. At the user home or building a receiving valve is provided for receiving the water from the bulk water hauler. The receiving valve is preferably installed in a freeze-free area and is protected by a locked cover. A water storage system is installed at the user location for containing the high quality water. A delivery valve is provided for connection to the receiving valve for the substantially air-free delivery of the bulk water to the user water storage system.

DETAILED DESCRIPTION OF THE PREFERRED EMBODIMENTS

Figure 1:
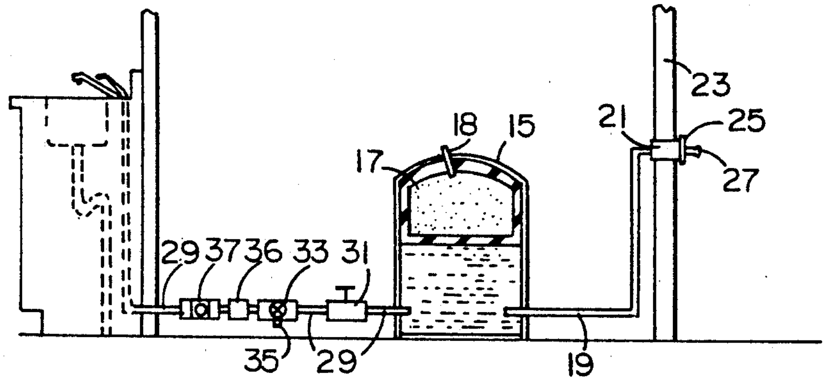
FIG. 1 is a side elevational view, partially in section, of a water storage system.

Referring to FIG. 1, the first embodiment of a water storage system of the present invention is shown. The storage system includes a tank 15 which has a pressurized bladder 17 mounted in the upper portion of the tank. Bladder 17 usually contains compressed air at 20–40 psi to determine the water pressure for the system. Pressurized air can be added to the bladder through valve 18. The tank is connected to an input conduit 19 which is connected to a receiving valve 21 mounted in the wall of the home or building 23. Receiving valve 21 has a cover 25 which contains a lock actuated by a key 27. Cover 25 protects receiving valve 21 from contaminants and vandalism and maintains the overall integrity of the water system. On the output side of the system, a conduit 29 is connected to tank 15. A valve 31, preferably a gate valve, is in the output conduit. Valve 31 can be used to seal the water tank from the internal plumbing of the building. A sampling valve 33 is provided in conduit 29. Valve 33 has an output 35 from which water samples can be drawn in periodically testing the quality of the water in the system. A pressure regulator 36 controls the pressure of the water entering the building. A separate pressure regulator enables the water in tank 15 to be stored at a higher pressure than the pressure of the water in the building system. A check valve 37 is provided to protect the integrity of the high quality water system and to protect the system from any possible backflow from the building plumbing. The system of FIG. 1 is particularly useful where the amount of bulk, high quality water needed is limited, for example, in a typical residence.

Figure 2:
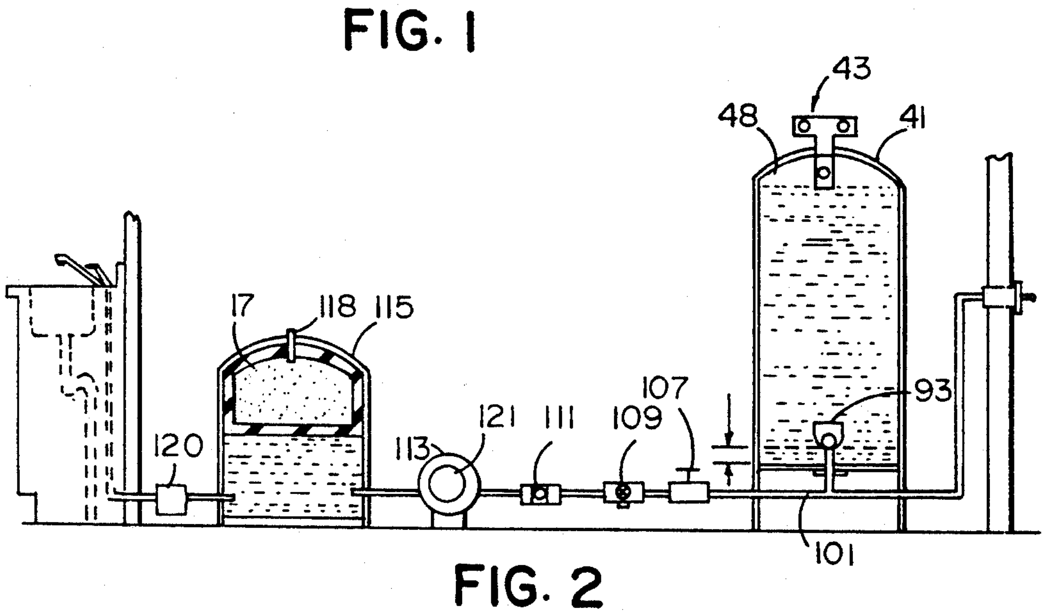
FIG. 2 is a side elevational view, partially in section, of a second embodiment of a water storage system.

FIG. 2 shows a second embodiment of the water system suitable for use in a large commercial installation which would require large amounts of water. The system can employ a large tank 41 capable of holding several hundred gallons of high quality water. Several tanks of the same or of different sizes can also be connected together to provide sufficient water storage capacity. Tank 41 should preferably be lined or coated with an organic polymeric material such as an epoxy-type polymer. The tank can also be lined with glass. The lining is used to protect the large volume of water contained in the tank from picking up any metallic taste from the tank. For example, if tank 41 is made of steel it is possible for rust to form on the inner surface of the tank which would add an undesirable iron taste to the water in the tank. On the top of tank 41 is mounted a three-way check valve 43 which plays an important roll in both the filling and emptying of tank 41. An enlarged view of valve 43 is shown in FIG. 9.

The three check valves included in valve 43 are preferably mounted in a T-shaped housing 45. The first check valve 47 is mounted in the vertical leg of the "T" and includes a lower perforated plate or screen 49 which is held in a circumferential support 51. Plate 49 is perforated so that water can rise in the vertical leg of housing 45 as tank 41 is filled. A second plate 53 is mounted in the vertical leg above plate 49. Plate 53 has a shaped aperture 55 which forms a tightly fitting valve seat for the floating valve member 57. As shown in FIG. 9, the floating valve member is in the form of a ball which would be of low enough density to be supported by the water as the water fills the vertical leg of the "T." Floating valve member 57 is captured between the upper and lower plates 53 and 49, respectively, and rises under the influence of the water to seat itself firmly in valve seat 55, stopping the addition of any more water to the tank. As shown in FIG. 2, the vertical leg of the T-shaped housing extends downwardly into the top of tank 41. When check valve 47 closes, a quantity of air 48 is trapped in the top of the tank. The trapped air protects the tank from filling completely and provides a cushion for the water pump in the bulk delivery system.

Figure 9:
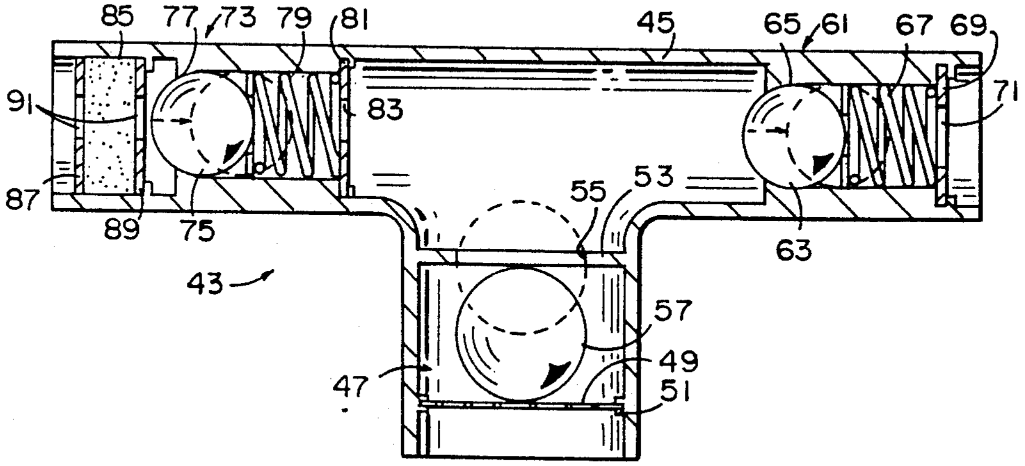
FIG. 9 is a sectional view of a three-way check valve.

A second check valve 61 is mounted in the right-hand side of the T-shaped housing, as shown in FIG. 9. As water fills tank 41, the air trapped above the water is forced upwardly into the vertical leg of housing 43 where it passes through floating check valve 47 and can then escape the tank through check valve 61. Check valve 61 has a movable valve member 63 which is shown in the form of a ball. The valve member can also be in the form of a hinge member or even a living hinge in a plastic housing. Ball 63 is normally biased to the closed position in a valve seat 65 by a coil spring 67 which rests against a plate 69. Plate 69 has an aperture 71 through which the air can escape as it passes check ball 63. When check valve 47 closes, and air is no longer being forced out of tank 41, spring 67 forces check valve ball 63 into position against valve seat 65 closing check valve 61.

As water is drawn out of tank 41, air must enter the top of the tank to protect the tank from possible collapse under the force of atmospheric pressure and to prevent a partial vacuum from forming which would interfere with the draining of the tank. A check valve 73 is provided in the left arm of T-shaped housing 45, as shown in FIG. 9. Check valve 73 is similar to check valve 61; however, check valve 73 only allows air to enter tank 41 and does not allow air to escape from the tank. Check valve 73 has a check ball 75 which is normally biased to the closed position against a valve seat 77 by a coil spring 79. Coil spring 79 pushes against a plate 81 which has an aperture 83 therein to allow air to enter tank 41.

In order to protect the integrity of the high quality water stored in tank 41, a filter 85 is mounted in housing 45 in front of check valve 73. The filter used can be selected to cope with the contaminants in the air in the vicinity of large storage tank 41. A compound or multilayer filter can be used, for example, with coarse porous paper or fabric for dust and large particulate material, fine porous material for biological contaminants and activated charcoal for organic materials. Filter layer 85 is contained between two support plates 87 and 89 each of which has an aperture 91 disposed in its center. Plates 87 and 89 can also be replaced by a metal screen material or a metal framework to provide greater access to filter media 85.

Figure 11:
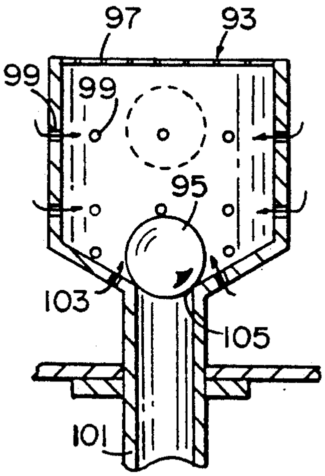
FIG. 11 is a sectional view of a second embodiment of a floating check valve.

The water in tank 41 drains through an outlet valve 93 (FIG. 11). Valve 93 is mounted at the outlet at the bottom of water tank 41 and has a floating ball member 95 contained within a porous trap 97. Valve 93 is preferably of a circular configuration having apertures 99 disposed about its surface so that water can freely enter and exit through an outlet conduit 101. The bottom of valve 93 has a sloping wall 103 leading to a valve seat 105. When tank 41 is filled with water, valve ball 95 will rise to the top of container 97 where it is trapped and prevented from floating freely in the water tank. As the water level drops in tank 41, ball 95 will eventually come to rest on valve seat 105 stopping any additional water from exiting the system.

Figure 10:
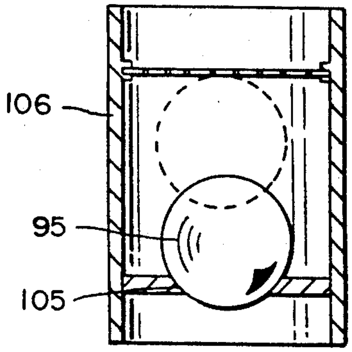
FIG. 10 is a sectional view of a floating check valve.

The valve of FIG. 10 is similar to the valve of FIG. 11 but would preferably be used in in-line applications. Housing 106 can be made sufficiently large so that the flow of water through the valve does not cause ball 95 to be pushed onto valve seat 105.

For simplicity, the floating valve sealing member is illustrated as a ball. Other float configurations can be used, as well as other forms of valves, to suit particular water system requirements.

Water outlet pipe 101 (FIG. 2) has a valve 107 for shutting off the entire system and a sampling valve 109 so that periodic samples of water can be tested to determine the purity of the water. A check valve 111 is provided to prevent any backflow from the remainder of the water system into bulk storage tank 41. A pump 113 is provided to force water into a smaller water tank 115, which contains an inflated bladder 117, which is pressurized through valve 118 similar to that described in FIG. 1. A pressure regulator 120 determines the pressure of the water entering the building. An outlet pipe 119 connects smaller tank 115 to the building water system. Pump 113 is equipped with a pressure sensitive switch 121 which will shut off the pump when it senses the increase in pressure caused by check valve ball 95 entering valve seat 105. As pump 113 continues to pump, pressure sensitive switch 121 turns off the pump.

The disabling of pump 113 alerts the users of the water system that the main storage tank needs to be refilled and that the only water remaining in the system is the water contained in tank 115. Tank 41 is filled through a similar input system as that shown in FIG. 1.

As shown in FIGS. 1 and 2, the water is in the small tank while the pressurizing air is contained within an expandable bladder. It is clearly within the scope of the present invention to reverse this relationship to put the water into an expandable bladder and the air directly into the tank. In the latter case the tank would not have to be coated to protect the water from picking up any taste from the metal.

Figure 3:
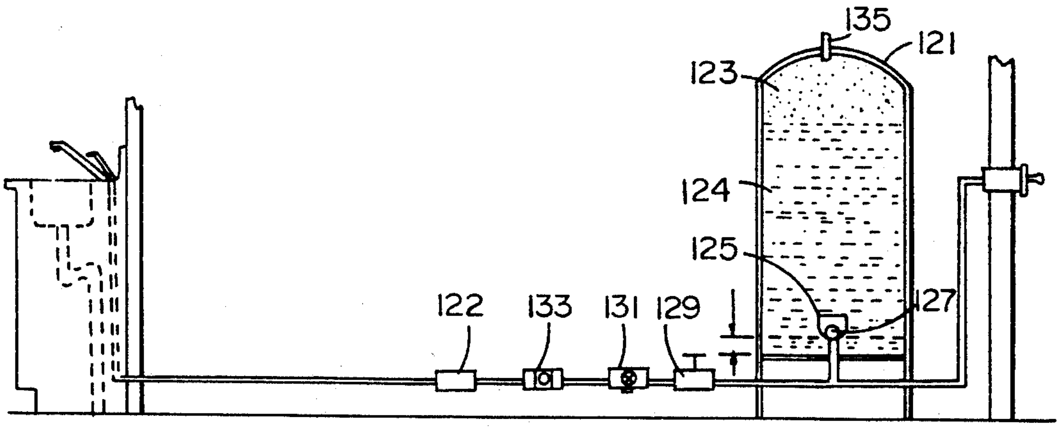
FIG. 3 is a side elevational view, partially in section, of a third embodiment of a water storage system.

The water system of FIG. 3 can be used for either a residential or a small commercial establishment. The water system employs a tank 121 which, like tank 41, is preferably coated on the interior surface with a material to protect the water from picking up any metallic taste. In this system, as well as the systems of FIG. 2, non-metallic tanks can be used. For example, the shell of the tank can be made of fiberglass reinforced plastic wound with fiberglass and epoxy resin. The input system for tank 121 is the same as that shown in FIGS. 1 and 2. In the top of tank 121, a predetermined volume of a substantially water insoluble, harmless gas 123 such as air or nitrogen in contained. The gas can be added to the top of the tank through valve 135 which can be similar to the conventional valves used to inflate automobile and bicycle tires. Water 124 enters the tank and in rising compresses gas 123 putting pressure on the water system similar to the previously described tanks employing a flexible bladder. The outlet of tank 121 employs a floating valve member 125 similar to valve 93. As the water lowers in tank 121, valve ball 127 will come to rest on the valve seat shutting off or stopping the flow of water before any of gas 123 can escape from tank 121. As in FIG. 3, tank 121 has a main system valve 129, a sampling valve 131, a check valve 133 for protecting the integrity of water 124 stored in tank 121, and a pressure regulator 122. A pressure regulator can be included in valves 129 or 131 or in check valve 133 to limit the water pressure applied to the building plumbing.

Figure 4:
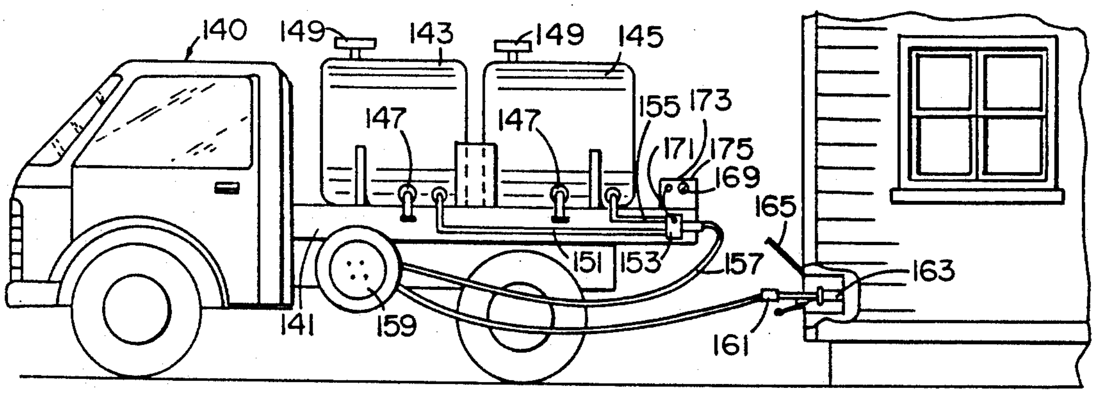
FIG. 4 is an elevational view of a water hauling vehicle connected to deliver water.

As shown in FIG. 4, the water hauling vehicle is illustrated in the form of a flat bed truck 140 having a conventional cab and supporting wheels. The truck has a frame 141 upon which are, schematically represented, bulk water hauling tanks 143 and 145. Both of the bulk water hauling tanks are filled from the bottom through connections 147. Each of the tanks has an air filter 149 mounted at the top to release air from the tank as the tank is filled from the bottom and to filter incoming air to displace the water as the tanks are emptied. The type of filter materials used in filters 149 depends on the environment in which the water hauling vehicle will be operating. As discussed in relation to FIG. 9, a single or compound, multi-layer filter can be used to remove particulate, biological and chemical materials from the air entering bulk water hauling tanks 143 and 145.

Tank 143 is connected by an outlet pipe 151 to a pump 153 which pressurizes the water and delivers it to the customer. Tank 145 has a similar outlet pipe 155 connected to pump 153. The operator of the truck can select the particular tank to be emptied for the customer. Tanks 143 and 145 can carry high quality potable water, as well as distilled water, depending on customer needs. A delivery hose 157 is stored on a reel 159 and is connected by a delivery valve 161 to the customer's receiving valve 163. As shown in FIG. 4, receiving valve 163 is recessed into the home and is normally protected by a flap or door 165. In all of the northern states, and particularly in areas where the temperature can drop below the freezing temperature of water, the receiving valve should be mounted so that the valve seat and the valve body cannot become frozen or cracked.

As discussed in relation to the water system of FIG. 2, using the three-way check valve of FIG. 9, the water is pumped into storage tank 41 until check valve 47 closes. A pressure sensitive switch 169 is connected to pump 153 by an electrical conductor 171. When the pressure of pump 153 rises due to the closing of check valve 47, pressure sensitive switch 169 shuts off the pump and stops the delivery of water. Pump 153 is preferably a centrifugal pump which inherently can provide a cushion when the check valve on the storage tank closes. When the water delivery stops, a metering valve 173 can print out a receipt or bill 175 for the customer indicating the quantity of water delivered. Valve 161 can then be disconnected from valve 163 and water hauling vehicle 140 can move on to another customer.

Figure 5:
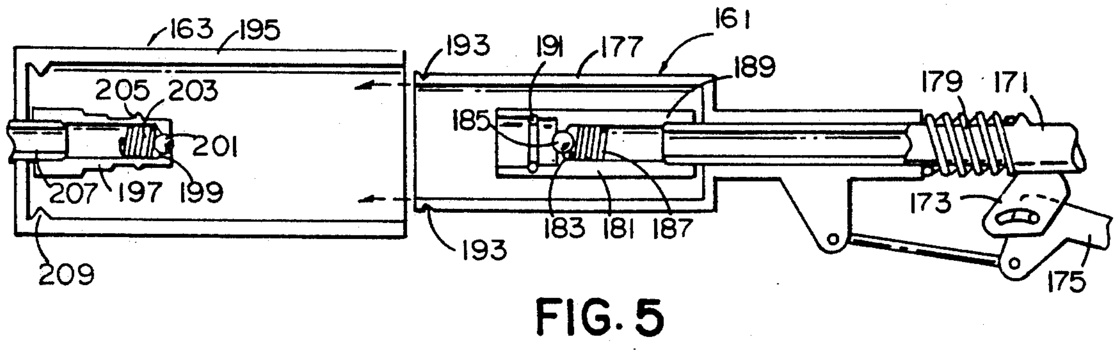
FIG. 5 is a schematic side elevational view, partially in section, showing a water delivery valve and a water receiving valve.
Figure 6:
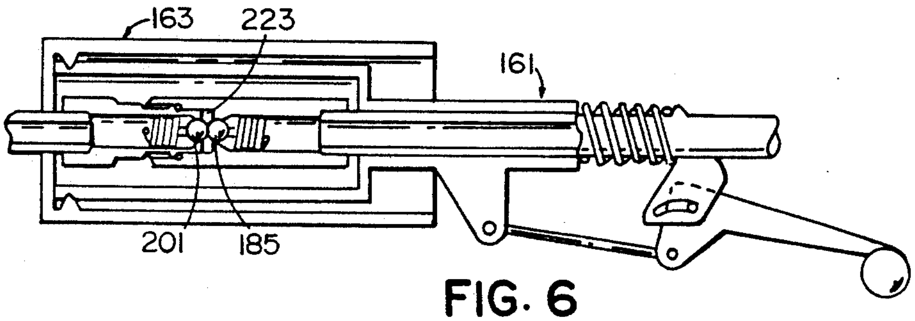
FIG. 6 is a schematic side elevational view, partially in section, showing the water delivery valve locked to the water receiving valve.
Figure 7:
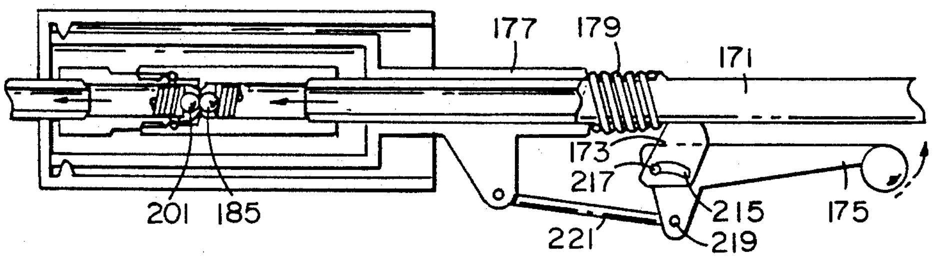
FIG. 7 is a schematic side elevational view, partially in section, showing the water delivery valve and the water receiving valve both open for the transfer of water.

Now referring to FIGS. 5, 6 and 7, water delivery valve 161 is shown. The delivery valve has a tubular frame 171 upon which is mounted a support 173 for a valve operating handle 175. A sleeve 177 is coaxially mounted on tubular frame 171 and is biased away from operating handle support 173 by a coil spring 179. At the end of tubular frame 171 a valve member 181 is mounted. Valve 181 has a valve seat 183 upon which a ball valve closure member 185 is normally biased by a spring 187. A portion of ball member 185 projects outwardly beyond the end of valve 181. A sleeve 189 surrounds valve 181 and extends ahead of ball valve member 185. Sleeve 189 has an internal circumferential gasket 191 therein. Movable shell 177, which surrounds fixed sleeve 189, has a locking member 193 on its outer surface.

Receiving valve 163 has a stationary outer shell 195 which normally projects through the wall of a residence or commercial building, as shown in FIGS. 1-3. Shell 195 can be made of metal or plastic. Fixed shell 195 is long enough so that receiving valve 197 can be recessed into a freeze-free area in the building. Valve 197 has a valve seat 199 upon which a ball valve member 201 is normally biased by a coil spring 203. A circumferential shoulder 205 is on the outer surface of valve 197. Valve 197 closes off the input conduit 207 to the water store system in the residence or commercial building. Within fixed shell 195 is a locking member 209 which interacts with locking members 193 on the outer surface of movable shell 177 on the delivery valve. Locking members 193 and 209 can be a half thread or a pair of lugs and a channel for receiving the lugs. When movable shell 177 enters fixed shell 195, and is moved to the rear end of the fixed shell, delivery valve 161 can be given a partial turn to lock members 193 and 209 together.

As shown in FIG. 6, delivery valve 161 is locked to receiving valve 163 with ball members 201 and 185 in surface contact. The circumferential shoulder 205 on valve 197 is pressed tightly against gasket 191 in fixed sleeve 189 on the delivery valve. In this position the two valves are locked together for the air-free transfer of water from the bulk hauling system into the storage system. The locations of gasket 191 and shoulder 205 can be reversed on the delivery and receiving valves without affecting the operation of the valves. It is very important that air not enter the system through the two valves to reduce the risk of contamination of the delivered water and the water storage system. Also, it is important to limit the amount of air that enters the water storage tank so as not to reduce the water capacity of the tank with unnecessary air.

While valves 181 and 197 have been illustrated with ball-shaped sealing members, it is clearly within the scope of the present invention to use other shaped sealing members. For example, each ball can be replaced by a sealing member in the form of a truncated cone. The valve springs can hold the cones against the valve seats until the sealing members are pushed back when the flat ends of the cones are pushed together.

As shown in FIG. 7, operating handle 175 is compressed toward tubular frame 171 which forces the entire assembly forward pushing back ball valve members 201 and 185 enabling water to flow from the delivery system into the receiving system. Actuating handle 175 can be held by the operator compressing spring 179. In order to avoid operator fatigue, if a large volume of water is to be delivered, a slot 215 is provided in handle support 173. A pivot pin 217 on the operating handle can slide forward in slot 215 putting the pivot point of pin 217 ahead of pivot point 219 for connecting rod 221 which is connected to movable shell 177. In this position, the operating handle is in effect toggled and will stay in this position without being held. When the automatic pump on the bulk water hauling system turns the pump off, the operator can release handle 175 from the toggle position, closing both the delivery valve and the receiving valve. The delivery valve can then be given an opposite twist to disconnect locking members 193 and 209, separating the two valves. When the two valves separate, the small amount of water trapped in a cavity 223 formed between gasket 191 and the front of the delivery valve washes off the ends of the two valves. The system is then closed and the delivery valve can be withdrawn from the receiving valve.

Figure 8:
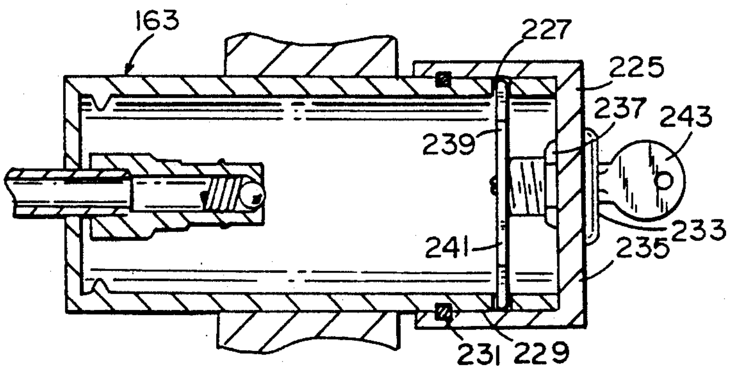
FIG. 8 is a side elevational view, partially in section, showing a water receiving valve mounted in a wall with a locked cover in place.
Figure 12:
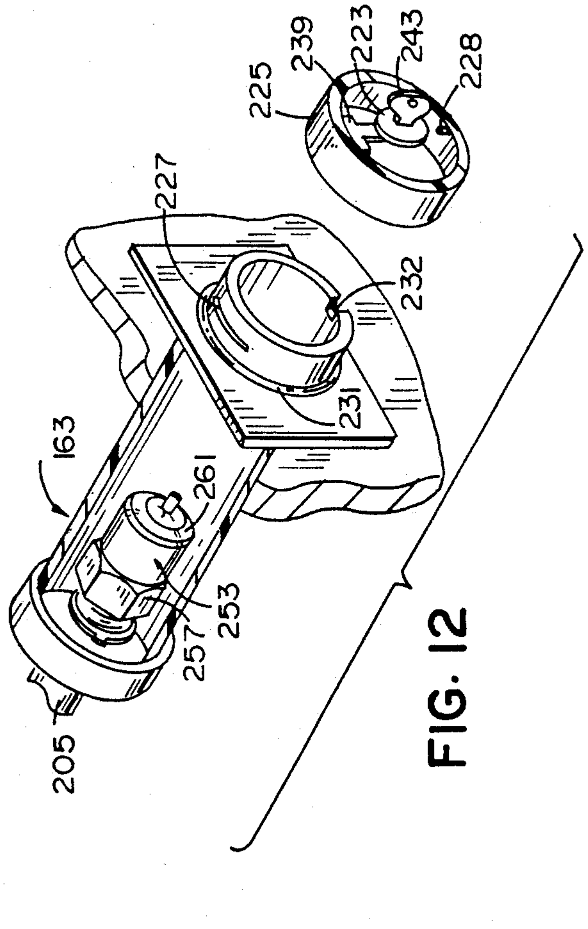
FIG. 12 is an exploded sectional view of a water receiving valve with cover removed.

In order to protect receiving valve 197 from contamination and vandalism, a locking cover 225 is provided (FIGS. 8 and 12). In the preferred embodiment, receiving valve 163 has an aperture 227 in the top and a slot 232 in the bottom. The slot preferably has an offset portion similar to that used with a bayonet connector. On the outer surface of the sleeve an O-ring 231 can be mounted. Cap 225 has an elongated shell which can butt up against O-ring 231 substantially sealing receiving valve 163 from any contamination. A pin 228 projects upwardly from the bottom of cap 225. The pin can slide into slot 232 and, by turning the cap into the offset portion of the slot, keep the bottom of the cap from being pried out. In the center of cap 225 is mounted a lock 233 which is fastened to a surface 235 of cover 225 by a threaded nut 237 which can be tightened against the back of the cover. A locking member 239 is caused to extend into aperture 227 when a key 243 is turned in the lock. The locking member and pin being offset prevent the cap from being pried off. A spring loaded locking member can also be used to automatically lock the cover when it is pushed back into place by the delivery person. The use of lock 233 and O-ring 231 substantially seals receiving valve 163, protecting it from both contamination and vandalism, thereby maintaining the integrity of the high quality water system.

Figure 14:
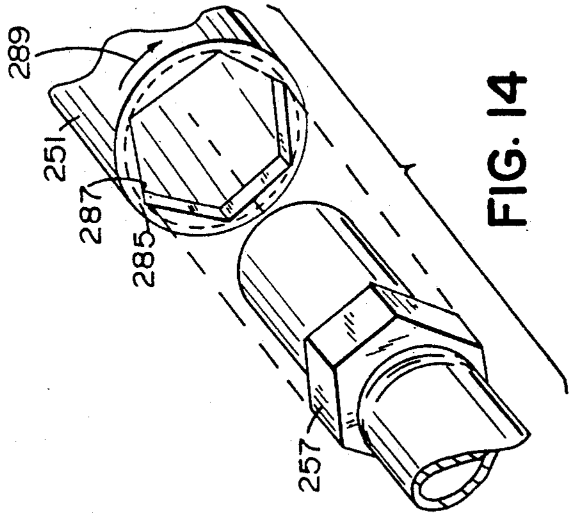
FIG. 14 is an exploded view of the metal-to-metal lock used with the valves of FIG. 13.
Figure 13:
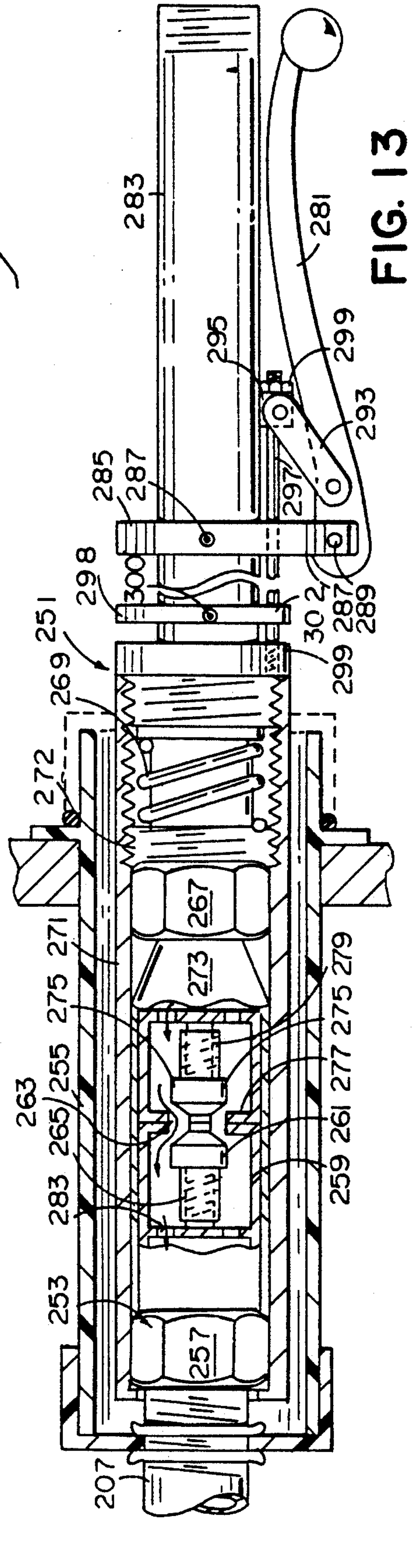
FIG. 13 is a sectional view showing a second embodiment of the water receiving and delivery valves locked together.

In FIGS. 5, 6 and 7 the delivery valve and receiving valves can be locked together using locking members on each outer shell. Since in many installations the outer shell of receiving valve will be made of plastic, a stronger combination of the delivery and receiving valves is preferred. Referring to FIGS. 13 and 14, delivery valve 251 is shown connected to a receiving valve 253. The receiving valve is mounted in a plastic protective shell 255 similar to the shell used with valve 163. Receiving valve 253 has a large coupling nut 257 for attaching the receiving valve body to pipe 207 which connects to the water system inside the residence or building. A metal, preferably brass, valve housing 259 is used for the receiving valve. Within valve body 259 a truncated cone sealing or shut-off member 261 is provided. Sealing member 261 is forced into contact with valve seat 263 by a coil spring 265.

Delivery valve 251 has an internally threaded nut 267 which connects the valve to tubular member 283. Delivery valve 251 has a coil spring 269 for biasing the outer sleeve 271 of the valve. The coil spring presses against a ring 272 which is threaded into sleeve 271. Coil spring 269 also biases operating handle 281 to the normally off position and to the locked position when handle 281 is pressed against pipe 283 during delivery of water. The valve body 273, preferably made of brass, is threaded onto the end of pipe 283. Within valve body 273 there is a truncated, cone-shaped sealing member 275 which is urged against a valve seat 277 by a coil spring 279. An actuating handle 281 is fastened to tubular member 283. The actuating handle is attached by means of a split locking ring 285 which is held in place by a screw 287. The split ring 285 has a pair of substantially identical extending portions 287 which provide a support for a pivot pin 289.

One end of handle 281 is pivotally supported by pivot pin 289. A link 293 connects between handle 281 and an end piece 295 which is mounted on the end of an actuating rod 297. Actuating rod 297 extends parallel to tubular member 283 and passes through end piece 295 where it is held by a nut 299 threaded onto the end of the rod. A guide ring 298 is mounted on pipe 283 by set screws 300. Guide ring 298 has an aperture 302 through which actuating rod 297 extends. Guide ring 298 protects actuating rod 297 from being bent during use of the valve. End piece 299 is threadedly attached to shell 271.

End piece 295 can be used to adjust the throw of handle 281 so that it will releasably lock itself in place with the delivery valve in the open position. Spring 269 will keep handle 281 pressed against tubular member 283. This enables the delivery person to release his or her grip on handle 281 when a large quantity of water is being delivered. Since the delivery truck is equipped with an automatic shut-off pump, the water will stop flowing when the receiving tank is full. The delivery person then starts movement of handle 281 away from the delivery position and coil spring 269 will move the handle back to the valve closed position.

As shown in FIG. 13, delivery valve 251 and receiving valve 253 are coupled for the substantially air-free delivery of water. It can be seen that when the actuating handle 281 is pulled or compressed toward the valve body of the delivery valve is pushed forward causing these two sealing members to be pushed back off their valve seats to allow water to flow through the valves, as shown by the arrows 283.

Now referring to FIG. 14, coupling nut 257 of the receiving valve can be seen to have a hexagonal outer surface. Delivery valve 251 has a shaped closure 285 with a hexagonal aperture or cutout 287 which can slide over coupling nut 257. When delivery valve 251 has passed over coupling nut 257, the valve is given a partial twist, as indicated by the arrow 289, which turns the hexagonal aperture in valve 251 out of alignment with hexagonal coupling nut 257 bringing the back portion of coupling member 285 into contact with the back of the coupling nut providing a tight metal-to-metal seal between the two delivery valves. Handle 281 can then be actuated to initiate the flow of water. The delivery and receiving valves, as shown in FIGS. 13 and 14, are the preferred valves since they provide a tight metal-to-metal connection for the substantially air-free delivery of water without contacting or gripping the plastic shell which is used to protect the receiving valve from contamination and vandalism. As in the case of the previously described delivery and receiving valves, when the delivery handle is released the small amount of water contained between the two valves flushes off the face of the valves maintaining the cleanliness of the receiving valve. The delivery valve can be removed and cap 225 put in place and locked as described in relation to FIGS. 8 and 12.

It can be seen from the above description that a complete high quality water system is provided for the delivery of water right from the well or spring to the user. Great care has been taken throughout the system to protect the water from contamination. In order to even further protect the water, many states require that a small quantity of chlorine be added to the water. This can be done at the time the bulk water tanks are filled so that the entire water delivery system only contains water containing chlorine sufficient to control any health problem while at the same time not adding a chlorine taste to the water, thus preserving the fresh taste.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows:

1. A system for delivery and receiving high quality water comprising:

a delivery valve means for controlling the flow of water from a supply of high quality water;

a receiving valve means at a customer for receiving water from said supply of high quality water;

locking means for locking said delivery valve means and receiving valve means together;

manual operating means on said delivery valve means for controllably opening and closing said delivery and receiving valve means for the substantially air-free delivery of a quantity of water from said supply of high quality water;

a cover for said receiving valve means, said cover comprising:

an elongated sleeve means surrounding and extending beyond the end of said receiving valve means, said sleeve means having at least one aperture therein adjacent the end of said sleeve means;

a cap means for fitting over the end of said coaxial sleeve means; and a lock means disposed on said cap means, said lock means including at least one movable locking member for insertion into said at least one aperture in said sleeve means to lock said cover means in place on said sleeve means thereby protecting said receiving valve means from contamination and vandalism.

2. A delivery valve for delivering high quality water, wherein said delivery valve comprises:

a tubular frame means providing a fluid passage for said water;

a delivery valve means mounted on said frame means for controlling the flow of water through said tubular frame means, said delivery valve means including:

a valve seat means for said valve;

a sealing means for controlling the flow of water through said delivery valve means;

a biasing means for using said sealing means into contact with said valve seat means for normally closing said delivery valve means;

a shroud means coaxially mounted on said delivery valve means and extending outwardly from said delivery valve means for receiving valve means;

a sleeve means slidably mounted on said frame means, said sleeve means being coaxially mounted relative to said delivery valve means and said frame means;

an actuating handle means on said frame means for moving said delivery valve means and said frame means relative to said sleeve means; and locking means on said sleeve mean for locking said delivery valve means to said receiving valve means.

3. A delivery valve for the substantially air-free delivery of high quality water comprising:

a tubular frame means providing a fluid passage for said water;

an actuating handle means mounted on said frame means;

a delivery valve means mounted on said frame means for controlling the flow of water through said frame means, said delivery valve means including:

a valve seat means for said valve;

a sealing means for resting on said valve seat means for controlling the flow of water through said delivery valve means;

a biasing means for using said sealing means into contact with said valve seat means for normally closing said delivery valve means;

a shroud means coaxially mounted on said delivery valve means and extending outwardly from said delivery valve means for receiving a receiving valve means;

a sleeve means slidably mounted on said frame means, said sleeve means being coaxially mounted relative to said delivery valve means and said frame means, said delivery valve means and said frame means being movable by said actuating handle means when said sleeve means is locked to a receiving valve means; and locking means on said sleeve means for locking said delivery valve means to a receiving valve means while leaving said sealing means biased against said valve seat means and said delivery valve means closed.

4. A delivery valve as set forth in claim 3, wherein when said delivery valve means is locked to a receiving valve means said actuating handle means can move said sleeve means relative to said delivery valve means causing both said delivery valve means and receiving valve means to open for the transfer of water from said delivery valve means to said receiving valve means.

5. A receiving valve means for the substantially air-free receipt of high quality water comprising:

a receiving valve means having a first and a second end, said first end of said valve means being attached to the end of a water conduit with said second end extending away from said first end;

a valve seat means for said valve means positioned within said valve near said second end;

a sealing means for controlling the flow of water through said valve means;

a biasing means for urging said sealing means into contact with said valve seat means for normally closing said valve means;

a coaxial sleeve means surrounding said receiving valve means; and a locking means on said sleeve means for locking said receiving valve means to a delivery means while leaving said sealing means biased against said valve seat means and said receiving valve means closed.

6. A receiving valve means as set forth in claim 5, including a cover means for said receiving valve means, said cover comprising:

an elongated cap member for fitting over the end of said coaxial sleeve means on said receiving valve means; and a lock means disposed on said cap means, said lock means including at least one movable locking member for insertion into said at least one aperture in said sleeve means to lock said cover means in place on said sleeve means thereby protecting said receiving valve means from contamination and vandalism.

7. A storage system for high quality water comprising:

a receiving valve means for the substantially air-free transfer of high quality water into said storage system;

a storage tank means connected to said receiving valve means for receiving and storing said high quality water;

a check valve means on said storage tank means, said check valve means comprising:

a first check valve means including a valve seat means and a floating valve means which allows air to pass around said floating valve means as said storage tank means is being filled by high quality water and for closing said first check valve means when said floating valve means is buoyed by said water into said valve seat means;

a second check valve means including a valve closing means in communication with said first check valve means, said second check valve means only allowing air to flow out of said storage tank means;

a third check valve means in communication with said first check valve means, said third check valve means including a valve closing means only allowing air to flow into said storage tank means;

air filter means for filtering the air passing through said third check valve means into said storage tank means; and a fourth check valve means in the water outlet from said storage tank means, said fourth check valve means including a valve seat means and a floating valve means for resting on said valve seat for closing said water outlet from said storage tank means when said floating valve means comes to rest on said valve seat means due to the removal of water from said storage tank means.

8. A storage system for high quality water as set forth in claim 7, wherein said first, second and third check valve means are all combined in a single housing.

9. A storage system for high quality water as set forth in claim 8, wherein said housing is T-shaped and said first check valve means is in the vertical leg of the "T" and the second and third check valve means are in opposite arms of the T-shaped housing.

10. A storage system for high quality water as set forth in claim 7, wherein said fourth check valve means is contained in an enclosure through which water can pass and said valve seat is positioned at the bottom of said enclosure.

11. A storage system for high quality water comprising:

a receiving valve means for the substantially air-free transfer of high quality water into said storage system;

a storage tank means connected to said receiving valve means for receiving and storing said high quality water;

a predetermined quantity of a substantially water insoluble harmless gas confined in the top of said storage tank means;

a water filling means for adding water to the bottom of said storage tank means, said water compressing said gas above said water pressurizing said water in said tank;

an outlet means from said storage tank means; and a valve means in said outlet means from said storage tank means, said valve means including a valve seat means and a floating valve means for resting on said valve seat means for closing said water outlet means from said storage tank means when said floating valve means comes to rest on said valve seat means before said gas confined in said storage tank can escape through said outlet means.

12. A delivery valve for the substantially air-free delivery of high quality water, comprising:

a tubular frame means;

an actuating handle means mounted on said tubular frame means;

a delivery valve means mounted on the end of said tubular frame means for controlling the flow of water through said tubular frame means, said delivery valve means including:

a valve seat means for said valve;

a sealing means for controlling the flow of water through said delivery valve means; and a biasing means for urging said sealing means into contact with said valve seat means for normally closing said delivery valve means;

a sleeve means slidably mounted on aid tubular frame means, said sleeve means being coaxially mounted relative to said delivery valve means and being movable relative to said delivery valve means by said actuating handle means for opening and closing said delivery valve means when said delivery valve means is locked to a receiving valve;

a connecting means for connecting said actuating handle means to said sleeve means;

biasing means on said tubular frame means for biasing said sleeve means away from said actuating handle means; and a shaped locking means on said sleeve means for passing over a similarly shaped receiving valve means for locking said delivery valve means and said receiving valve means together when said shaped locking means is turned so that the shaped receiving valve means interferes with the movement of the shaped locking means and for releasing said delivery valve means when said locking means is turned so that said shaped locking means can pass over said shaped receiving valve means.

13. A delivery valve as set forth in claim 12, wherein said locking means is an aperture in a closure for said sleeve means, the walls bounding said aperture forming an aperture configured to correspond to the outer configuration of said receiving valve means.

* * * * *

UNITED STATES PATENT AND TRADEMARK OFFICE

CERTIFICATE OF CORRECTION

PATENT NO. : 5,240,043

DATED : August 31, 1993

INVENTOR(S) : Gary J. Campbell

It is certified that error appears in the above-indentified patent and that said Letters Patent is hereby corrected as shown below:

column 10, line 19, claim 2: "using" should be --urging--;

column 10, line 24, claim 2: after "receiving" insert --a receiving--;

column 10, line 31, claim 2: "sleeve mean" should be --sleeve means--;

column 10, line 47, claim 3: "using" should be --urging--;

column 12, line 57, claim 12: "on aid" should be --on said--.

Signed and Sealed this

Thirty-first Day of May, 1994

*Attest:*

BRUCE LEHMAN

*Attesting Officer*

*Commissioner of Patents and Trademarks*